US010905137B2

(12) United States Patent
Piorkowski

(10) Patent No.: US 10,905,137 B2
(45) Date of Patent: Feb. 2, 2021

(54) QUILLAJA-STABILIZED LIQUID BEVERAGE CONCENTRATES AND METHODS OF MAKING SAME

(71) Applicant: Kraft Foods Group Brands LLC, Chicago, IL (US)

(72) Inventor: Daniel T. Piorkowski, Fairfield, CT (US)

(73) Assignee: Kraft Foods Group Brands LLC, Chicago, IL (US)

( * ) Notice: Subject to any disclaimer, the term of this patent is extended or adjusted under 35 U.S.C. 154(b) by 0 days.

(21) Appl. No.: 16/704,292

(22) Filed: Dec. 5, 2019

(65) Prior Publication Data

US 2020/0107561 A1 Apr. 9, 2020

Related U.S. Application Data

(62) Division of application No. 14/701,342, filed on Apr. 30, 2015, now Pat. No. 10,537,123.

(51) Int. Cl.
A23L 2/385 (2006.01)
A23L 2/52 (2006.01)
A23L 2/62 (2006.01)
A23L 29/25 (2016.01)
A23L 2/68 (2006.01)
A23D 7/005 (2006.01)
A23D 7/06 (2006.01)

(52) U.S. Cl.
CPC ............ *A23L 2/385* (2013.01); *A23D 7/0053* (2013.01); *A23D 7/06* (2013.01); *A23L 2/52* (2013.01); *A23L 2/62* (2013.01); *A23L 2/68* (2013.01); *A23L 29/25* (2016.08); *A23V 2002/00* (2013.01)

(58) Field of Classification Search
CPC . A23L 2/385; A23L 29/25; A23L 2/52; A23L 2/62; A23L 2/68; A23D 7/06
USPC .................. 426/590, 519, 650, 601
See application file for complete search history.

(56) References Cited

U.S. PATENT DOCUMENTS

| 4,986,994 | A | 1/1991 | Baccus, Jr. |
| 5,069,924 | A | 12/1991 | Baccus, Jr. |
| 5,853,785 | A | 12/1998 | Nayyar |
| 7,534,461 | B2 | 5/2009 | Zeller |
| 7,939,120 | B2 | 5/2011 | Inaba |
| 8,282,977 | B2 | 10/2012 | Bromley |
| 8,797,757 | B2 | 8/2014 | Kaneko |
| 2002/0034574 | A1 | 3/2002 | Prosise |
| 2003/0086952 | A1 | 5/2003 | Miller |
| 2006/0040023 | A1 | 2/2006 | Zeller |
| 2006/0040034 | A1 | 2/2006 | Zeller |
| 2006/0051483 | A1 | 3/2006 | Watanabe |
| 2006/0088627 | A1 | 4/2006 | Bartnick |
| 2007/0264401 | A1 | 11/2007 | Taormina |
| 2008/0069924 | A1 | 3/2008 | Zeller |
| 2008/0286421 | A1 | 11/2008 | Delease |
| 2009/0018186 | A1 | 1/2009 | Chen |
| 2010/0009052 | A1 | 1/2010 | Canessa |
| 2011/0020512 | A1 | 1/2011 | Masutake |
| 2011/0059205 | A1 | 3/2011 | Gaysinsky |
| 2011/0086154 | A1 | 4/2011 | Hawkins |
| 2011/0143007 | A1 | 6/2011 | Stengel |
| 2012/0083530 | A1 | 4/2012 | Mai |
| 2012/0251685 | A1 | 10/2012 | Wang-Nolan |
| 2013/0004621 | A1 | 1/2013 | Schrader |
| 2013/0017295 | A1 | 1/2013 | Bromley |
| 2013/0040036 | A1 | 2/2013 | Zeller |
| 2013/0052320 | A1 | 2/2013 | Umezawa |
| 2013/0078353 | A1 | 3/2013 | Ryan |
| 2013/0142909 | A1 | 6/2013 | Klingenberg |
| 2013/0210916 | A1 | 8/2013 | Mai |
| 2013/0216692 | A1 | 8/2013 | Sabater |
| 2013/0309218 | A1 | 11/2013 | Terao |
| 2013/0323379 | A1 | 12/2013 | Bernal |
| 2013/0344222 | A1 | 12/2013 | Ohmiya |
| 2015/0030748 | A1 | 1/2015 | Schultz |
| 2015/0257403 | A1 | 9/2015 | Sanz-Valero |

FOREIGN PATENT DOCUMENTS

| EP | 2721933 | 4/2014 |
| RU | 2322158 | 10/2005 |

OTHER PUBLICATIONS

English translation of Office Action dated Jul. 16, 2019 for Russian Patent App. No. 2017137141 (2 pgs.).
PCT; App. No. PCT/US2016/029315; Internatioinal Prelimary Report on Patentability and Written Opinion dated Oct. 31, 2017 (6 pgs.).

*Primary Examiner* — Helen F Heggestad
(74) *Attorney, Agent, or Firm* — Fitch, Even, Tabin & Flannery LLP

(57) ABSTRACT

Disclosed are stabilized emulsion-including concentrates for drinkable beverages. The emulsion concentrates are stable at pH as low as about 2.0 to about 2.5 and include *quillaja*, non-aqueous solvent, acidulant, lipid, and water. The emulsion-including concentrates may remain shelf-stable independently and as part of a drinkable beverage for about twelve months. Methods for making the emulsion-including concentrates are also provided.

10 Claims, No Drawings

QUILLAJA-STABILIZED LIQUID BEVERAGE CONCENTRATES AND METHODS OF MAKING SAME

CROSS-REFERENCE TO RELATED APPLICATIONS

This application is a divisional of application Ser. No. 14/701,342, filed Apr. 30, 2015, which is incorporated herein by reference in its entirety.

FIELD

The disclosure relates to liquid beverage concentrates, particularly, to emulsion-including acidic beverage concentrates including a non-aqueous liquid and stabilized with *quillaja*.

BACKGROUND

Flavored beverages are widely used by consumers and are often prepared using liquid concentrated drink mixes, including commercially-available products like TANG®, CRYSTAL LIGHT®, and KOOL-AID®, to provide beverages in a variety of flavors, including fruit and tea flavors. The ingredients of beverage concentrates often contain oils as flavoring agents and are often in a form of an emulsion where the flavor molecules are suspended within an aqueous medium. Most of the emulsions used in the beverage industry are oil-in-water emulsions, although there may be advantages to using other emulsion types for some applications. Flavored beverages may also be prepared from frozen, fruit-flavored concentrates, such as those traditionally sold in canisters. Such frozen concentrates typically include a large amount of water and are generally diluted at a ratio of 1 part concentrate to 3 parts water to provide the fruit flavored beverage. These types of products are often susceptible to spoilage and require storage at freezer temperatures to provide the desired shelf life.

A drinkable beverage from a beverage concentrate may be prepared using a two-step process, where a beverage concentrate including emulsified oil is prepared first, and is then diluted in water to create a drinkable beverage. Beverage emulsions are considered thermodynamically unstable systems that tend to break down over time due to a variety of physicochemical mechanisms, including gravitational separation, flocculation, coalescence and Ostwald ripening. Beverage emulsions may include weighting agents incorporated into the oil phase to slow gravitational separation of the oil droplets. A number of different weighting agents are known for utilization within commercial beverage products. Such weighting agents include brominated vegetable oil (BVO), sucrose acetate isobutyrate (SAIB), glycerol ester of Wood Rosin (GEWR and also referred to as ester gum), and dammar gum. Drawbacks of weighting agents such as SAIB, BVO, and GEWR include legal limits imposed on the amount of such weighting agents that can be added to the emulsions, and the fact that such weighting agents may be perceived by the consumers as not "natural" and thus undesired.

SUMMARY

Disclosed are *quillaja*-stabilized emulsion-including acidic beverage concentrates including a non-aqueous liquid.

In one approach, a concentrate includes about 0.01% to about 10% *quillaja*; about 15% to about 70% non-aqueous solvent; about 2% to about 60% acidulant; about 0.1% to about 20% lipid; and about 1% to about 70% water. The concentrate includes an oil-in-water emulsion and the concentrate has a pH of about 2.0 to about 2.6 and is shelf-stable at storage temperatures of about 20° C. to about 25° C. for at least about 4 months.

In one approach, a method of making a concentrate including an oil-in-water emulsion includes: providing a solution including about 15% to about 70% non-aqueous solvent and about 2% to about 60% acidulant; mixing *quillaja*, a lipid, and water to form a blend in a form of an oil-in-water emulsion including about 0.01% to about 20% *quillaja*, about 0.01% to about 60% lipid, about 0% to about 10% buffer, and about 1% to about 99% water; and adding the blend in an amount of 0.1% to about 35% by total weight to the solution to form an emulsion-including concentrate having a pH of about 2.0 to about 2.6.

The concentrate may include 0.05% to about 5% *quillaja*.

The non-aqueous solvent may be selected from the group consisting of propylene glycol, glycerol, ethanol, triacetin, ethyl acetate, benzyl alcohol, vegetable oil, 1,3-propanediol, and combinations thereof.

The acidulant may be selected from the group consisting of citric acid, malic acid, succinic acid, acetic acid, adipic acid, tartaric acid, fumaric acid, phosphoric acid, lactic acid, salts thereof, and combinations thereof.

The lipid may be elected from the group consisting of castor oil, terpene hydrocarbons, flavor oils (consisting of one or more of the following derivatives: ketones, aldehydes, lactones, ethers, esters, sulfur compounds, furanones, terpenoids), oil soluble vitamins, nutraceuticals, fatty acids, poly-unsaturated fatty acids, triglycerides and triglyceride derivatives, antioxidants, colorants, vegetable oils, and combinations thereof.

The concentrate may have a ratio of the water to the non-aqueous solvent in the concentrate is from about 6:1 to about 1:6 and a ratio of the water to the acidulant in the concentrate is from about 60:1 to about 1:10.

The buffer may be selected from the group consisting of sodium, calcium or potassium salts of citrate, malate, succinate, acetate, adipate, tartrate, fumarate, phosphate, lactate, or carbonate, and combinations thereof.

The concentrate may include water in an amount of 30% or less.

In one approach, the concentrate does not include a weighting agent.

The concentrate may be shelf-stable at storage temperatures of about 20° C. to about 25° C. for about twelve months.

DETAILED DESCRIPTION

*Quillaja* is an organic/natural surfactant extracted from the bark of the *Quillaja saponaria* tree. It is known for its use as a foam stabilizer and an emulsifier for oil-in-water emulsions. *Quillaja* is known to contain surface active components that are capable of forming surfactant micelles and stabilizing oil-in-water emulsions and can be used to form emulsions containing small droplets that are stable to changes in pH, ionic strength, and temperature. When *quillaja* is used as an emulsifier, it is believed to stabilize a beverage emulsion through electrostatic repulsion (i.e. negatively-charged functional groups within the emulsifier). Other types of emulsifiers such as gum acacia stabilize oil droplets through negatively-charged electrostatic repulsion and steric hindrance. *Quillaja* has been found to be stable in products stored at ambient (20° C.-25° C.) temperatures for up to a year. One advantage of *quillaja* over gum acacia is that, due to *quillaja*'s ability to stabilize small oil droplet size, unlike gum acacia, *quillaja* may not need a weighting agent such as BVO, SAIB, or GEWR (ester gum) to stabilize the emulsion. Another advantage of *quillaja* is that, when used in a beverage application, *quillaja* is typically considered by the beverage industry as a "natural flavor" unlike many other beverage emulsifiers such as gum acacia, modified food starch, polysorbate 60, DATEM, and the like.

One known disadvantage of using *quillaja* in beverage concentrate emulsions is that, when the pH of the aqueous phase of the emulsion drops under approximately 2.6, *quillaja* is believed to lose its negative charges due to the protonation of the negative functional groups of *quillaja* by the free hydrogens of the acidulants present in the concentrate. This is believed to cause *quillaja* to no longer to stabilize the emulsion through electrostatic repulsion. The *quillaja*-stabilized oil droplets may then be permitted to aggregate together, possibly coalesce (i.e., one or more smaller droplets may fuse into one or more larger droplets), and cream (i.e., float upward) to the surface of the liquid concentrate and/or the finished beverage, which is considered undesirable. To date, there is no known method to stabilize *quillaja* for a beverage application with a pH under 2.6.

Generally, emulsion-including beverage concentrates described herein include *quillaja* that provides enhanced stability to the ingredients of the beverage concentrates. More particularly, the emulsion-including beverage concentrates including *quillaja* as described herein provide enhanced flavor stability despite a low pH (i.e., from about 2.0 to about 2.6). In one aspect, at least some of the water in the emulsion beverage concentrates is replaced with a non-aqueous solvent, advantageously restricting the protonation of the *quillaja* by the acidulants present in the beverage concentrates. While the disclosure is primarily directed to the use of emulsion concentrates for providing flavored beverages, the use of the emulsion concentrates to provide flavor to a variety of food products is also contemplated. In some approaches, the emulsion concentrates disclosed herein remain shelf-stable for up to about twelve months and can be diluted to prepare flavored beverages with desired flavor profiles and with little or no flavor degradation.

As used herein, the term "concentrate" means a liquid composition that can be diluted with an aqueous, potable liquid to provide a beverage or added to a food product prior to being consumed. The phrase "liquid" refers to a non-gaseous, flowable, fluid composition at room temperature (i.e., about 20° C. to about 25° C.). By "shelf-stable," it is meant that the concentrate avoids substantial flavor degradation and is microbially stable such that the concentrate has an aerobic plate count (APC) of less than about 5000 CFU/g, yeast and mold at a level less than about 500 CFU/g, and coliforms at 0 MPN/g for at least about six months, in another aspect at least about eight months, in another aspect at least about ten months, and in yet another aspect at least about twelve months, when stored at e room temperature in a sealed container. In some approaches, "enhanced flavor stability" and "avoiding substantial degradation of flavor" means that the emulsion concentrates described herein retain more flavor after storage at room temperature over the shelf life of the product as compared to an otherwise identical concentrate including water instead of a combination of water and a non-aqueous solvent. In other approaches, "enhanced flavor stability" and "avoiding substantial degradation of flavor" means that there is little change in flavor and development of off flavor in the concentrate when stored at room temperature over the shelf life of the product in a sealed container.

In various aspects, the beverage concentrates as described herein are oil-in-water emulsions having a pH of below about 2.6, and in other cases, from about 2.0 to about 2.6, and include about 0.01% to about 10% *quillaja*; about 15% to about 70% non-aqueous solvent; about 2% to about 60% acidulant; about 0.1% to about 20% lipid; and about 1% to about 70% water. By virtue of balancing the amount of non-aqueous liquid, water, and acidulants in the system, the emulsion-including beverage concentrates described herein advantageously contain less dissociated acid and have less *quillaja* degradation, which provides for enhanced stabilization of the emulsion concentrates in comparison to otherwise identical concentrates including only water and no non-aqueous liquid.

The emulsion-including beverage concentrates may include about 0.01% to about 8% *quillaja* in one approach, about 0.05% to about 5% *quillaja* in another approach, and about 0.075% to about 3.5% *quillaja* in yet another approach. In one aspect, due to the use of *quillaja* as an emulsifier, the emulsion concentrates described are substantially free of weighting agents, thereby advantageously lowering manufacturing costs. Without wishing to be limited by theory, the emulsions as described herein may be substantially free of a weighting agent due to the ability of *quillaja* to stabilize small oil droplets. As used herein, the term "substantially free of" means that a component is entirely absent or is present in an amount of up to about 0.05%, up to about 0.1%, or up to about 0.5% by total weight of the composition. Structurally, *quillaja* has negative charges that provide for its emulsion-stabilizing effect via electrostatic repulsion. While *quillaja* typically loses its negative charges due to protonation of the functional groups of *quillaja* by the free hydrogen of the present acidulants, which causes *quillaja* to no longer to stabilize the emulsion through electrostatic repulsion, the presence of a non-aqueous solvent in the emulsion-including beverage concentrates as described herein advantageously associates with the acid present in the concentrate and restricts and/or eliminates the de-protonation of the acid, permitting *quillaja* to maintain its negative charges and stability.

In other aspects, the acidulant or acidulants provided in the emulsion-including beverage concentrates described herein may be selected from the group consisting of citric acid, malic acid, succinic acid, adipic acid, tartaric acid, fumaric acid, phosphoric acid, lactic acid, salts thereof, and combinations thereof. By one approach, the selection of the acidulant used in various embodiments of the beverage concentrates described herein can provide substantially improved flavor and decreased aftertaste, particularly when the concentrate is dosed to provide a final beverage with greater than typical amounts of the beverage concentrate. In some aspects, the selection of the acidulant may depend, at least in part, on the desired pH of the concentrate and/or taste imparted by the acidulant to the diluted final beverage. In another aspect, the amount of acidulant included in the concentrate may depend on the strength of the acid. For example, a larger quantity of lactic acid would be needed in the concentrate to reduce the pH in the final beverage than a stronger acid, such as phosphoric acid.

In various beverage concentrate applications, it may be desirable to include acidulant in the concentrate so that a flavored beverage made therefore has a tart flavor that enhances the overall flavor profile of the beverage. For example, it may be desirable to provide a lemon-flavored beverage that has a tart flavor similar to that of a lemonade drink made with fresh lemons. A variety of other flavors can also be enhanced by a tart flavor, such as other fruit flavors. In some approaches, the liquid concentrates provided herein include a substantial acidulant content. In one aspect, the beverage concentrate includes at least about 3% to about 60% acidulant in one aspect, in another aspect about 5% to about 45% percent acidulant, in yet another aspect about 7.5% to about 45% percent acidulant, and in still another aspect about 10% to about 35% percent acidulant by weight of the concentrate.

In other aspects, the lipid or lipids provided in the emulsion-including beverage concentrates described herein may be selected from the group consisting of castor oil, terpene hydrocarbons, flavor oils (possibly consisting of the following types of molecules: ketones, aldehydes, lactones, ethers, esters, sulfur compounds, furanones, terpenoids), oil soluble vitamins, nutraceuticals, fatty acids, poly-unsaturated fatty acids, triglycerides and triglyceride derivatives, antioxidants, colorants, vegetable oils, and combinations.

In some aspects, the emulsion-including beverage concentrates described herein include water in an amount of about 1 to about 70 percent, in another aspect from about 5 percent to about 45 percent, in another aspect about 10 percent to about 40 percent water. For purposes of calculating the water content of the emulsion beverage concentrates described herein, the amount of water in a concentrate includes water included as a separate ingredient as well as any water provided in any ingredients used in the concentrate. In at least some aspects, the presence of water in any form is minimized to the extent practical. Without wishing to be limited by theory, inclusion of large amounts of water in emulsion-including beverage concentrates can be problematic for a number of reasons, including, for example: (1) supporting growth of microbes, such as yeast, mold, and bacteria; (2) facilitating hydrolysis of flavor components and other unwanted chemical reactions; and (3) limiting the amount of flavoring or other ingredients that can be dissolved in the concentrate. Furthermore, high water content can also be detrimental to the emulsion when acidulants are included in the emulsion due to lowering of pH and resulting instability of some ingredients at low pH.

For example, some flavorings, sweeteners, vitamins, and/or color ingredients are rapidly degraded in water or an acidic environment, thereby limiting the types of flavorings that are suitable for inclusion in water-based beverage concentrates or ready-to-drink beverages. For instance, some flavor degradation reactions require the presence of water while others require protons from dissociated acids. Certain types of flavorings, such as acid labile citrus flavorings including terpenes and sesquiterpenes, have greater susceptibility to degradation, and products including them typically have very short shelf lives (even a matter of days) when stored above refrigeration temperatures due to development of off-flavor notes and alteration of the taste profile of the product. Exemplary other ingredients exhibiting instability in water and/or at low pH include, for example, vitamins, particularly vitamins A, C, and E; high potency sweeteners (such as, for example, monatin, neotame, Luo Han Guo), colorants (such as for example fruit and vegetable extracts, anthocyanins, copper chlorophyllin, curcumin, riboflavin), sucrose, proteins, hydrocolloids, starch, and fiber. These types of ingredients can advantageously be included in the emulsion-including beverage concentrates described herein and exhibit improved stability when stored at room temperatures compared to otherwise identical concentrates having higher amounts of water and no non-aqueous solvent.

The emulsion-including beverage concentrates may include about 15% to about 70% non-aqueous liquid in one approach, about 20% to about 60% non-aqueous liquid in another approach, and about 25% to about 50% non-aqueous liquid in yet another approach. Exemplary non-aqueous liquids include, but are not limited to, propylene glycol, glycerol, triacetin, ethanol, ethyl acetate, benzyl alcohol, vegetable oil, vitamin oil (e.g., Vitamin E, Vitamin A), 1,3-propanediol, and combinations thereof. In one aspect, selection of the non-aqueous liquid for use in the beverage concentrates may depend, at least in part, on the ability of the non-aqueous liquid to solubilize other ingredients of the concentrate or to form an emulsion with another non-aqueous liquid.

For example, sucralose, a high intensity sweetener, is more readily solubilized in 1,3-propanediol than in propylene glycol. Therefore, beverage concentrates including sucralose may be advantageously prepared using a solvent comprising 1,3-propanediol to provide a beverage concentrate that is able to maintain sucralose in solution throughout its shelf life. In other instances, selection of the non-aqueous liquid may also depend, at least in part, on the flavor provided by the non-aqueous liquid and the desired taste profile in the final beverage. In yet other instances, selection of the non-aqueous liquid may also depend, at least in part, on the viscosity and/or the desired density of the resulting concentrate.

In some aspects, the emulsion concentrates may have a ratio of the water to the non-aqueous solvent from about 7:1 to about 1:5 in one aspect, from about 4:1 to about 1:4 in another aspect, from about 3:1 to about 1:3 in yet another aspect, and from about 1:2 to about 2:1 in still another aspect.

In some aspects, the emulsion concentrates may have a ratio of the *quillaja* to the non-aqueous solvent from about 1:1500 to about 1:2 in one aspect, from about 1:900 to about 1:5 in another aspect, from about 1:850 to about 1:20 in yet another aspect, and from about 1:750 to about 1:50 in still another aspect.

As described in more detail in U.S. application Ser. No. 13/416,671 filed Mar. 9, 2012, which is incorporated by reference herein in its entirety, acidulants typically have lower acid dissociation constants ($K_a$) in organic liquids (such as non-aqueous liquids) than in water. For instance, the $K_a$ value for a particular acidulant may be, for example, several orders of magnitude or more lower in a non-aqueous liquid than in water. If the acidulant is dissolved in a mixture of water and a particular non-aqueous liquid, its resulting $K_a$ value would generally be intermediate between its $K_a$ values in pure water and pure non-aqueous liquid, and its exact $K_a$ value would be related to the ratio of water to non-aqueous liquid in the mixture.

For example, an acidulant having a $K_a$ value equal to about $10^{-3}$ (and a $pK_a$ value, defined as $(-\log_{10} K_a)$, equal to about 3) in water might have a $K_a$ value equal to about $10^{-8}$ (and a $pK_a$ value equal to about 8) in a particular non-aqueous liquid/solvent, such as propylene glycol. Accordingly, the $K_a$ value corresponding to the extent of acid dissociation occurring in the acidulant would be expected to be about five orders of magnitude lower (about 100,000 times lower) in the particular non-aqueous liquid than in water. Further, if the acidulant is dissolved in a mixture of water and a particular non-aqueous liquid, its resulting $K_a$ value would generally be intermediate between its $K_a$ values in pure water and pure non-aqueous liquid, and its exact $K_a$ value would be related to the ratio of water to non-aqueous liquid in the mixture. In general, the relationship between the acidulant $K_a$ value and the composition of liquid in which the acidulant is dissolved is logarithmic in nature. Therefore, replacing even small proportions of water with one or more non-aqueous liquid advantageously produces substantial reductions in the acidulant $K_a$ value and extent of acid dissociation in a liquid mixture. For example, replacing about half the water in the concentrate with a non-aqueous liquid may reduce the acidulant $K_a$ value and extent of acid dissociation in a liquid mixture by many hundred-fold, many thousand-fold, many million-fold, or more depending on the composition of the non-aqueous liquid(s) and the proportion of water in the liquid mixture.

The non-aqueous liquids utilized in the beverage concentrates described herein may be either protic or aprotic. As used herein, protic non-aqueous liquids possess one or more hydroxyl group having an ionizable hydrogen atom, while aprotic non-aqueous liquids do not. Protic non-aqueous liquids that are particularly suited because of their generally bland flavor and compatibility with foods include, for example, glycerol, propylene glycol, and 1,3-propanediol. Aprotic non-aqueous liquids that may be utilized for generally the same reasons include, for example, triacetin and vegetable oils, such as coffee oil or medium-chain triglyceride oils. In general, food acids dissolved in aprotic non-aqueous liquids will dissociate to a lesser extent than the same acids dissolved in protic non-aqueous liquids, and acids dissolved in non-aqueous liquid mixtures will dissociate to intermediate extents in general proportion to the compositions and levels of non-aqueous liquids present. The non-aqueous liquids can be selected to advantageously control extent of acid dissociation and pH of the beverage concentrates created using acidic flavor sources and/or added acids.

Because non-aqueous liquids typically have higher solvent self-dissociation constants than water, acidulants dissolved in non-aqueous liquids have higher pH values than acidulants dissolved in water. Even though an acidulant may completely dissolve in a non-aqueous liquid, it is believed that protons present in the acidulant's carboxyl groups may not dissociate or weakly dissociate (relative to their dissociation in water)—or may dissociate but remain in close proximity to carboxyl anions—to beneficially lower the free proton concentration and thereby lower the potential to cause or promote chemical reactions in the concentrate. Further, the lower water content in the beverage concentrates described herein reduces or prevents formation of highly reactive, strongly acidic hydronium ions that are present in acidified aqueous solutions. Therefore, the formation of hydronium ions is higher in concentrates including higher amounts of water and lesser amounts of non-aqueous liquid. Lower $K_a$ values and the resulting free proton concentration in the liquid beverage concentrates provided herein are believed to greatly slow or prevent unwanted chemical reactions, thereby improving flavor stability and product shelf-life despite the relatively high acidulant content.

In some aspects, the concentrated flavor composition may further include a sweetener. Useful sweeteners may include both nutritive and non-nutritive sweeteners, including both low intensity and high intensity sweeteners, such as, for example, honey, corn syrup, high fructose corn syrup, erythritol, sucralose, aspartame, stevia, saccharine, monatin, luo han guo, neotame, sucrose, Rebaudioside A (often referred to as "Reb A"), fructose, cyclamates (such as sodium cyclamate), acesulfame potassium, and combinations thereof. The selection of sweetener and amount of sweetener added may depend, at least in part, on the desired viscosity of the concentrated flavor composition. For example, nutritive sweeteners like sucrose may be included in much higher amounts than high intensity sweeteners like neotame to provide the same level of sweetness and such higher total solids content contributed by the sweetener increases the viscosity of the composition. If desired, the sweetener can generally be added in an amount of about 0.2 to about 60 percent, with the lower end of the range generally more appropriate for high intensity sweeteners and the upper end of the range generally more appropriate for nutritive sweeteners.

In some aspects, the concentrates may further include from about 0% to about 20% buffer in one approach, from about 0% to about 15% buffer in another approach, from about 0% to about 10% buffer in yet another approach, and from 0% to about 5% buffer in still another approach. For concentrates having lower water content, such as less than about 15 percent, buffer may be included for primarily flavor purposes. For concentrates having higher water content, such as about 15 to about 30 percent water, buffer may be included in an amount relative to the acidulant content. For example, the acid:buffer ratio can be about 1:1 to about 25,000:1, in another aspect about 1.25:1 to about 4000:1, in another aspect about 1.7:1 to about 3000:1, and in another aspect about 2.3:1 to about 250:1. In this respect, a buffered concentrate may include more acidulant and can be diluted to provide a final beverage with enhanced tartness due to increased acidulant content as compared to a beverage provided from an otherwise identical concentrate at the same pH but which lacks buffers. Inclusion of buffers may also be advantageous to the flavor profile in the resulting final beverage.

Suitable buffers include, for example, a conjugated base of an acid (e.g., sodium citrate and potassium citrate), acetate, phosphate or any salt of an acid. In other instances, an undissociated salt of the acid can buffer the concentrate. In some approaches, the buffer may be selected from a group consisting of sodium, calcium or potassium salts of citrate, malate, succinate, acetate, adipate, tartrate, fumarate, phosphate, lactate, or carbonate, and combinations thereof.

The concentrates described herein may be provided with a variety of different flavors, such as, for example, fruit flavors, tea flavors, coffee flavors, and combinations thereof. Flavorings useful in the liquid concentrates described herein may include, for example, liquid flavorings (including, for example, alcohol-including flavorings (e.g., flavorings including ethanol, propylene glycol, 1,3-propanediol, glycerol, and combinations thereof), and flavor emulsions (e.g., nano- and micro-emulsions)) and powdered flavorings (including, for example, extruded, spray-dried, agglomerated, freeze-dried, and encapsulated flavorings). The flavorings may also be in the form of an extract, such as a fruit extract. The flavorings can be used alone or in various combinations to provide the concentrate with a desired flavor profile. The flavorings can be included at about from about 0.01 percent to about 10 percent in one aspect, from about 0.05 percent to about 8 percent in another aspect, from about 0.75 percent to about 7 percent in yet another aspect, and from about 0.1 percent to about 6 percent in still another aspect.

In another aspect, a variety of different alcohol-including flavorings may be included in the concentrated composition. The alcohols typically used in commercially available flavorings include compounds having one or more hydroxyl groups, including ethanol and propylene glycol, although others may be used, if desired. The flavoring may also include 1,3-propanediol, if desired. Suitable alcohol-including flavorings include, for example, lemon, lime, cranberry, apple, watermelon, strawberry, pomegranate, berry, cherry, peach, passionfruit, mango, punch, white peach tea, sweet tea, and combinations thereof.

Optionally, colors can be included in the liquid beverage concentrates. The colors can include artificial colors, natural colors, or a combination thereof.

Optionally, the concentrated flavor compositions can further include salts, preservatives, viscosifiers, surfactants, stimulants, antioxidants, caffeine, electrolytes (including salts), nutrients (e.g., vitamins and minerals), stabilizers, gums, and the like. Preservatives, such as EDTA, sodium benzoate, potassium sorbate, sodium hexametaphosphate, nisin, natamycin, polylysine, and the like can be included, if desired. Exemplary salts include, for example, sodium citrate, mono sodium phosphate, potassium chloride, magnesium chloride, sodium chloride, calcium chloride, the like, and combinations thereof.

In various approaches, the beverage concentrates described herein may be formulated to be diluted by a factor of at least 25 times to provide a final beverage, which can be, for example, an 8 ounce beverage. By some approaches, the beverage concentrate can be provided at a concentration of about 25 to about 500 times, in another aspect about 25 to about 225 times, in another aspect about 50 to about 200 times, in another aspect about 75 to about 160 times, and in yet another aspect about 90 to about 120 times that needed to provide a desired level of flavor intensity, acidity, and/or sweetness to a final beverage, which can be, for example, an 8 ounce beverage. The term "final beverage" as used herein means a beverage that has been prepared by diluting the beverage concentrate to provide a beverage in a potable, consumable form. By way of example, to clarify the term "concentration," a concentration of 75 times (i.e., "75×") would be equivalent to 1 part concentrate to 74 parts water (or other potable liquid) to provide the final beverage. In other words, the flavour profile of the final beverage is taken into account when determining an appropriate level of dilution, and thus concentration, of the emulsion-including beverage concentrate. The dilution factor of the beverage concentrate can also be expressed as the amount necessary to provide a single serving of concentrate.

Because of the high concentration factor (i.e., at least about 25×) of the beverage concentrates provided herein, large amounts of acidulant (i.e., at least about 5 percent) are included in the concentrates to provide the desired tartness in the final beverage. It was surprisingly found that a large quantity of acidulant could be included in the beverage concentrates in the amount necessary to provide a tart flavor when diluted to provide a final beverage but without detrimentally affecting the stabilizing function of *quillaja* or the stability of the flavor ingredients. The emulsion-including beverage concentrates as described herein have high acidulant content and due at least to the present of the non-aqueous solvent are advantageously characterized by reduced production of off-flavor notes and reduced degradation of added coloring and/or sweeteners, particularly high intensity sweeteners, during storage at room temperature as compared to otherwise identical beverage concentrates with higher water content. More specifically, by virtue of balancing the amount of non-aqueous liquid, water, acidulant, *quillaja* and lipid in the system, the liquid beverage concentrate contains less dissociated acid and has less flavor degradation after, for example, twelve months storage at room temperature in comparison to an otherwise identical concentrate including water instead of non-aqueous liquid.

The emulsion-including beverage concentrates as described herein can be prepared by a variety of processes. Concentrates in the form of emulsions, solutions (i.e., in which the ingredients are dissolved in the non-aqueous liquid), and suspensions can be prepared by the methods described below. The concentrates described herein can include both water-soluble and water-insoluble ingredients, as well as ingredients that are soluble and insoluble in the selected non-aqueous liquid. Other methods of preparing the liquid concentrates having low water content as described herein can also be used, if desired. The following methods are intended to be exemplary but not limiting in scope.

In one aspect, a beverage concentrate is provided in the form of a solution. In this respect, a method is provided for preparing a beverage concentrate in the form of an oil-in-water emulsion, the method comprising providing a solution including about 15% to about 70% non-aqueous solvent and about 3% to about 50% acidulant; mixing *quillaja*, a lipid, and water to form a blend in a form of an oil-in-water emulsion including about 0.01% to about 20% *quillaja*, about 0.01% to about 60% lipid, and about 1% to about 99% water; and adding the blend in an amount of 0.1% to about 35% by total weight to the solution to form an emulsion-including beverage concentrate having a pH of about 2.0 to about 2.6.

The beverage concentrates described herein can also be added to potable liquids to form flavored beverages. In some aspects, the emulsion-including beverage concentrate may be non-potable (such as due to the high acid content and intensity of flavor). For example, the beverage concentrate can be used to provide flavor to water, cola, carbonated water, tea, coffee, seltzer, club soda, the like, and can also be used to enhance the flavor of juice. In one aspect, the beverage concentrate can be used to provide flavor to alcoholic beverages, including but not limited to flavored champagne, sparkling wine, wine spritzer, cocktail, martini, or the like. By some approaches, the concentrate can be added to the potable liquid without stirring.

The concentrates described herein can be combined with a variety of food products to add flavor to the food products. For example, the concentrates described herein can be used to provide flavor to a variety of solid, semi-solid, and liquid food products, including but not limited to oatmeal, cereal, yogurt, strained yogurt, cottage cheese, cream cheese, frosting, salad dressing, sauce, and desserts such as ice cream, sherbet, sorbet, and Italian ice. Appropriate ratios of the beverage concentrate to food product or beverage can readily be determined by one of ordinary skill in the art.

The emulsion-including beverage concentrates as described herein may be packaged as follows. Some conventional beverages and beverage concentrates, such as juices, may be hot filled (for example, at 93° C.) during packaging and then sealed to prevent microbial growth. The beverage concentrates provided herein, given a combination of the non-aqueous liquid content, acidulant content, and low water activity, do not require thermal treatments or mechanical treatments, such as pressure or ultrasound, to reduce microbial activity either before or after packaging. By one approach, the beverage concentrates are advantageously suitable for cold filling while maintaining shelf stability for at least about three months, in another aspect at least about six months, in another aspect at least about eight months, in another aspect at least about ten months, and in another aspect at least about twelve months at room temperature. The packaging for the concentrates generally does not require additional chemical or irradiation treatment. The product, processing equipment, package and manufacturing environment need not be subject to aseptic packaging practices. As such, the concentrates described herein can allow for reduced manufacturing costs.

The concentrated beverage liquids described herein can be used with a variety of different types of containers. One exemplary container is described in WO 2011/031985, which is incorporated herein by reference in its entirety. Other types of containers can also be used, if desired. In one aspect, the liquid beverage concentrates may be packaged in containers in an amount of about 0.5 to about 6 oz. of concentrate, in another aspect of about 1 to about 4 oz., and in another aspect about 1 to about 2 oz., with the quantity being sufficient to make at least about 10 eight oz. servings of a final flavored beverage.

Advantages and embodiments of the concentrate compositions described herein are further illustrated by the following examples; however, the particular conditions, processing schemes, materials, and amounts thereof recited in these examples, as well as other conditions and details, should not be construed to unduly limit the compositions and methods described herein. All percentages in this application are by weight unless otherwise indicated.

EXAMPLES

The Examples below evaluate stability of the samples using an instability index that measures the overall degree of creaming of the entire sample. For purposes of this application, the instability index measures how much an oil droplet creamed or sedimented over a period of time in an aqueous solution. An instability index of 0 indicates no creaming while an instability index of 1 indicates complete creaming.

In the examples below, the emulsions were produced with a Silverson L4R High Shear Mixer with Silverson's Fine Emulsor Stator at 70° F. The samples were homogenized at ⅔ of the L4R's capacity speed for about 5 minutes. The samples in the examples below were analyzed by the dispersion analyzer LUMiSizer® (manufactured by LUM GmbH, Berlin, Germany) as emulsion concentrates. The software program of the LUMiSizer® was SEPView™ 6.1.2657.8312. Without wishing to be limited by theory, since creaming of the emulsions is due to gravity, the LUMiSizer® increases gravitational forces to accelerate creaming at various RCF values. The relative centrifugation force (RCF) will be understood to mean will be understood as amount of times the force provided by the machine is stronger than the earth's gravity.

The sample volumes were 1.5 ml and LUM 10.0 mm vials (polycarbonate synthetic cell, [110-132xx]) were used. The standard operating procedure used to generate the data in the examples below was as follows: speed of 2700 RPM, light factor of 1.0, temperature of 25.0° C., using 60 measurements and intervals being of 30 seconds and 60 additional measurements at intervals of 60 seconds.

Example 1

Procedure: an emulsion concentrate including 5% *Quillaja,* 10% Castor Oil, 84.95% Water, and 0.05% Potassium Sorbate was made using a High Shear Silverson Mixer L4R with Silverson's Fine Emulsor Stator at 70° F., by mixing for 5 minutes at ⅔ Speed. The emulsion concentrate was then added at 10% (w/w) to systems including 20% malic acid (w/w), 1.5% potassium citrate (w/w) and 68.5% total solvent (w/w). The total solvent levels were the following: 68% water (Sample A), 34% water and 34% glycerin (Sample B), 15% water and 53% glycerin (Sample C), 10% water and 58% glycerin (Sample D), 5% water and 63.5% glycerin (Sample E).

The samples were run at 2700 RPM in the LUMiSizer® for 500 seconds at approximately 970-980 g and were measured by the LUMiSizer® in the range of 17.51 mm (from 111.10 mm to 128.61 mm). The pH (reported by Brinkmann Metrohm pH meter 6.3026.250 and probe 6.0259.100 instrument [standardized per machine's protocol with pH 2, 4, and 7 buffer solutions]) and instability index (calculated and reported by the LUMiSizer®) of the samples were as follows:

TABLE 1

| Sample Name | pH | Instability Index |
|---|---|---|
| Sample A (0.5% Quillaja 1% Castor Oil; 68% Water) Day 1 | 2.10 | 0.54 |
| Sample B (0.5% Quillaja 1% Castor Oil; 34% Water; 34% Glycerin) Day 1 | 2.20 | 0.29 |
| Sample C (0.5% Quillaja 1% Castor Oil; 15% Water; 53% Glycerin) Day 1 | 2.25 | 0.25 |
| Sample D (0.5% Quillaja 1% Castor Oil; 10% Water; 58% Glycerin) Day 1 | 2.28 | 0.21 |
| Sample E (0.5% Quillaja 1% Castor Oil; 5% Water; 53% Glycerin) Day 1 | 2.33 | 0.18 |

It was observed that as more water was replaced with glycerin, the *quillaja* showed increasingly enhanced stability relative to the control (Sample A) due to glycerin's effect on the acidulants.

Example 2

The samples were prepared using the ingredients and procedure of Example 1, but the acidulants and buffer (i.e., malic acid and potassium citrate) were replaced with sucrose, a chemical that has no impact on electrostatic repulsion. The samples were run at 2700 RPM in the LUMiSizer® for 500 seconds at approximately 970-980 g and were measured by the LUMiSizer® in the range of 14.86 mm (from 111.10 mm to 125.96 mm). The pH (reported by Brinkmann Metrohm pH meter 6.3026.250 and probe 6.0259.100 instrument [standardized per machine's protocol with pH 2, 4, and 7 buffer solutions]) and instability index (calculated and reported by the LUMiSizer®) of the samples were as follows:

TABLE 2

| Sample Name | pH | Instability Index |
|---|---|---|
| Sample A (0.5% Quillaja 1% Castor Oil; 68% Water) Day 2 | 4.55 | 0.16 |
| Sample B (0.5% Quillaja 1% Castor Oil; 34% Water 34% Glycerin) Day 1 | 4.73 | 0.21 |
| Sample C (0.5% Quillaja 1% Castor Oil; 15% Water 53% Glycerin) Day 1 | 4.80 | 0.18 |
| Sample (0.5% Quillaja 1% Castor Oil; 10% Water 58% Glycerin) Day 1 | 4.83 | 0.16 |
| Sample E (0.5% Quillaja 1% Castor Oil; 5% Water 63% Glycerin) Day 1 | 4.83 | 0.14 |

The high instability index value (0.54) of the control Sample A in Example 1 was determined to be due to the presence of the acidulants, and Example 2 shows that when the acidulants were replaced with sucrose, the instability index of Sample A was substantially lower (0.16), which was in line with the instability indexes of the glycerin-including Samples B-E of Example 1.

Example 3

The samples were prepared using the ingredients and procedure of Example 1, but the instability index was measured on day 4 after storage of the concentrates at 70° F.). Sample A was not run due to destabilization on day 1. The samples were run at 2700 RPM in the LUMiSizer® for 500 seconds at approximately 970-980 g and were measured by the LUMiSizer® in the range of 17.55 mm (from 111.29 mm to 128.84 mm). The instability index (calculated and reported by the LUMiSizer®) of the samples was follows:

TABLE 3

| Sample Name | Instability Index |
| --- | --- |
| Sample B (0.5% Quillaja 1% Castor Oil, 34% Water 34% Glycerin 20% Acid) Day 4 | 0.29 |
| Sample C (0.5% Quillaja 1% Castor Oil, 15% Water 53% Glycerin 20% Acid) Day 4 | 0.25 |
| Sample D (0.5% Quillaja 1% Castor Oil, 10% Water 58% Glycerin 20% Acid) Day 4 | 0.17 |
| Sample E (0.5% Quillaja 1% Castor Oil, 5% Water 63% Glycerin 20% Acid) Day 4 | 0.17 |

It was observed that the concentrate had comparable (if not identical) instability index on day 4 as on day 1.

Example 4

The samples were prepared using the ingredients and procedure of Example 1, but medium chain triglycerides (MCT) were used in the place of castor oil. The samples were run at 2700 RPM in the LUMiSizer® for 150 seconds at approximately 970-980 g and were measured by the LUMiSizer® in the range of 16.75 mm (from 111.34 mm to 127.09 mm). The pH (reported by Brinkmann Metrohm pH meter 6.3026.250 and probe 6.0259.100 instrument [standardized per machine's protocol with pH 2, 4, and 7 buffer solutions]) and instability index (calculated and reported by the LUMiSizer®) of the samples were as follows:

TABLE 4

| Sample Name | pH | Instability Index |
| --- | --- | --- |
| Sample A (0.5% Quillaja 1% MCT, 68% Water 20% Acid) Day 1 | 2.10 | 0.64 |
| Sample B (0.5% Quillaja 1% MCT, 34% Water 34% Glycerin 20% Acid) Day 1 | 2.20 | 0.58 |
| Sample C (0.5% Quillaja 1% MCT, 10% Water 58% Glycerin 20% Acid) Day 1 | 2.26 | 0.16 |
| Sample D (0.5% Quillaja 1% MCT, 5% Water 63% Glycerin 20% Acid) Day 1 | 2.28 | 0.15 |
| Sample E (0.5% Quillaja 1% MCT, 15% Water 53% Glycerin 20% Acid) Day 1 | 2.33 | 0.14 |

This Example shows that even when castor oil is replaced with another lipid such as medium chain triglycerides, as more water was replaced with glycerin, the *quillaja* showed increasingly enhanced stability relative to the control (Sample A) due to glycerin's effect on the acidulants.

Example 5

The samples were prepared using the ingredients and procedure of Example 1, but terpene hydrocarbons were used in the place of castor oil. The samples were run at 2700 RPM in the LUMiSizer® for 500 seconds at approximately 970-980 g and were measured by the LUMiSizer® in the range of 17.38 mm (from 110.91 mm to 128.29 mm). The pH (reported by Brinkmann Metrohm pH meter 6.3026.250 and probe 6.0259.100 instrument [standardized per machine's protocol with pH 2, 4, and 7 buffer solutions]) and instability index (calculated and reported by the LUMiSizer®) of the samples were as follows:

TABLE 5

| Sample Name | pH | Instability Index |
| --- | --- | --- |
| Sample A (0.5% Quillaja 1% Terpene Hydrocarbons 34% Water 34% Glycerin 20% Acid) Day 1 | 2.10 | 0.77 |
| Sample B (0.5% Quillaja 1% Terpene Hydrocarbons 68% Water 20% Acid) Day 1 | 2.21 | 0.74 |
| Sample C (0.5% Quillaja 1% Terpene Hydrocarbons 15% Water 53% Glycerin 20% Acid) Day 1 | 2.24 | 0.51 |
| Sample D (0.5% Quillaja 1% Terpene Hydrocarbons 10% Water 58% Glycerin 20% Acid) Day 1 | 2.27 | 0.40 |
| Sample E (0.5% Quillaja 1% Terpene Hydrocarbons 5% Water 53% Glycerin 20% Acid) Day 1 | 2.34 | 0.26 |

This Example shows that as castor oil is replaced with another lipid such as terpene hydrocarbons, as more water was replaced with glycerin, the *quillaja* showed increasingly enhanced stability relative to the control (Sample A) due to glycerin's effect on the acidulants.

Example 6

The samples were prepared using the ingredients and procedure of Example 1, but propylyne glycol (PG) was used in the place of glycerin. The samples were run at 2700 RPM in the LUMiSizer® for 500 seconds at approximately 970-980 g and were measured by the LUMiSizer® in the range of 16.33 mm (from 111.73 mm to 128.06 mm). The pH (reported by Brinkmann Metrohm pH meter 6.3026.250 and probe 6.0259.100 instrument [standardized per machine's protocol with pH 2, 4, and 7 buffer solutions]) and instability index (calculated and reported by the LUMiSizer®) of the samples were as follows:

TABLE 6

| Sample Name | pH | Instability Index |
| --- | --- | --- |
| Sample A (0.5% Quillaja 1% Castor, 68% Water with 0% PG) Day 1 | 2.13 | 0.55 |
| Sample B (0.5% Quillaja 1% Castor, 34% Water with 34% PG) Day 1 | 2.34 | 0.12 |
| Sample C (0.5% Quillaja 1%, 15% Water with 53%) Day 1 | 2.55 | 0.13 |
| Sample D (0.5% Quillaja 1%, 10% Water with 58% PG) Day 1 | 2.47 | 0.16 |
| Sample E (0.5% Quillaja 1%, 5% Water with 63% PG) Day 1 | 2.43 | 0.24 |

This Example shows that as more water was replaced with another non-aqueous liquid such as propylene glycol, the *quillaja* showed increasingly enhanced stability relative to the control (Sample A) due to propylene glycol's effect on the acidulants.

The emulsion-including beverage concentrates described herein are advantageously stabilized by *quillaja* even at the low pH of 2.6 or below, thereby permitting the beverage concentrates to be shelf-stable for about 12 months. The use of *quillaja* as a stabilizer in the emulsion-including beverage concentrates described herein advantageously permit the beverage concentrates not to include weighting agents, thereby reducing manufacturing costs. In addition, the presence of the non-aqueous liquid in the beverage concentrates may slow the rate of flavor deterioration and provide for higher quality of flavor in the beverage concentrate and/or the final beverage over a longer period of time. In addition, the presence of the non-aqueous liquid in the beverage concentrate may advantageously reduce the corrosiveness of the beverage concentrate relative to the packaging due to a larger percentage of the acid not being in its active state. Yet another advantage of the beverage concentrates described herein is that *quillaja*-stabilized emulsions may be more concentrated than conventional emulsions, thereby saving on raw material costs and shipping costs.

The foregoing descriptions are not intended to represent the only forms of the concentrates in regard to the details of formulation. The percentages provided herein are by weight unless stated otherwise. Changes in form and in proportion of parts, as well as the substitution of equivalents, are contemplated as circumstances may suggest or render expedient. Similarly, while beverage concentrates and methods have been described herein in conjunction with specific embodiments, many alternatives, modifications, and variations will be apparent to those skilled in the art in light of the foregoing description.

What is claimed is:

1. A method of making a concentrate including an oil-in-water emulsion, the method comprising:
   providing a solution including about 15% to about 70% non-aqueous solvent and about 2% to about 60% acidulant;
   mixing *quillaja*, a lipid, and water to form a blend in a form of an oil-in-water emulsion including about 0.01% to about 20% *quillaja*, about 0.01% to about 60% lipid, about 0% to about 10% buffer, and about 1% to about 99% water;
   adding the blend in an amount of 0.1% to about 35% by total weight to the solution to form an emulsion-including concentrate having a pH of about 2.0 to about 2.6.

2. The method of claim 1, wherein the emulsion-including concentrate includes about 0.01% to about 8% *quillaja*.

3. The method of claim 1, wherein the non-aqueous solvent is selected from the group consisting of propylene glycol, glycerol, ethanol, triacetin, ethyl acetate, benzyl alcohol, vegetable oil, 1,3-propanediol, and combinations thereof.

4. The method of claim 1, wherein the acidulant is an selected from the group consisting of citric acid, malic acid, succinic acid, acetic acid, adipic acid, tartaric acid, fumaric acid, phosphoric acid, lactic acid, salts thereof, and combinations thereof.

5. The method of claim 1, wherein the lipid is selected from the group consisting of castor oil, terpene hydrocarbons, flavor oils (consisting of one or more of the following derivatives: ketones, aldehydes, lactones, ethers, esters, sulfur compounds, furanones, terpenoids), oil soluble vitamins, nutraceuticals, fatty acids, poly-unsaturated fatty acids, triglycerides and triglyceride derivatives, antioxidants, colorants, vegetable oils, and combinations thereof.

6. The method of claim 1, further comprising adding the blend to the solution to provide a ratio of the water to the non-aqueous solvent in the emulsion concentrate from 6:1 to about 1:6 and a ratio of the water to the acidulant in the emulsion concentrate is from about 60:1 to about 1:10.

7. The method of claim 1, wherein the buffer is selected from the group consisting of sodium, calcium or potassium salts of citrate, malate, succinate, acetate, adipate, tartrate, fumarate, phosphate, lactate, or carbonate, and combinations thereof.

8. The method of claim 1, further comprising adding the blend to the solution to provide the emulsion-including concentrate including water in an amount of 30% or less.

9. The method of claim 1, wherein the adding the blend to the solution does not include providing a weighting agent in the emulsion-including concentrate.

10. The method of claim 1, wherein the adding the blend to the solution provides the emulsion-including concentrate that is shelf-stable at temperatures of about 20° C. to about 25° C. for about twelve months.

* * * * *